United States Patent Office 3,188,220
Patented June 8, 1965

3,188,220
PROCESS OF MAKING REFRACTORY BRICK
CONTAINING CALCINED MAGNESIA
Russell Pearce Heuer, Villanova, Pa., assignor to General
Refractories Company, a corporation of Pennsylvania
No Drawing. Filed Aug. 29, 1962, Ser. No. 220,133
3 Claims. (Cl. 106—59)

The present application is a continuation-in-part of my copending application S.N. 66,903, filed November 3, 1960, for Process of Making Refractory Brick Containing Calcined Magnesia, now U.S. Patent 3,108,007, granted October 22, 1963.

The present invention relates to refractory brick made from calcined magnesia.

Calcined magnesia may be used alone or the calcined magnesia may be incorporated with other additions such as alumina, chrome ore, chromic oxide or other substances which are designed to be incorporated with the magnesia.

A purpose of the invention is to increase the strength at intermediate temperature above 1000° C. and at high temperature above 1600° C. of magnesia brick.

A further purpose is to eliminate the tendency of brick based on or containing substantial amounts of magnesia to lack volume stability and to lack ability to support static load at high temperature.

A further purpose is to cause a reaction between magnesia containing calcium magnesium silicate as a substantial mineralogical component and magnesia containing dicalcium ferrite as a substantial mineralogical component to form magnesium ferrite.

A further purpose is to mix together two different kinds of calcined magnesia, one kind having lime and silica as impurities in a ratio by weight of less than two and preferably one or less so that monticellite (a calcium magnesium silicate herein designated as CMS) is present and the other kind having ferric oxide (herein designated as F) in excess of two percent by weight and having lime and silica as impurities in a ratio by weight of more than two so that dicalcium ferrite (herein designated as $C_2F$) is formed, in order that the mixture when heated to a temperature between 1000° and 1700° C. either in a refractory kiln or in use, will react and diminish the amount of monticellite and also diminish the amount of dicalcium ferrite which are present, and instead will form ingredients which are more volume stable and more capable of supporting load at high temperature, particularly merwinite (herein designated as $C_3MS_2$) and magnesium ferrite (herein designated MF).

A further purpose is to select two kinds of magnesia as above described so that the mixture of the two will contain more than 90 percent by weight MgO on a calcined basis and between 0.8 and 3.0 percent by weight of $SiO_2$.

Further purposes appear in the specification and in the claims.

Calcined magnesia (often called dead-burned magnesite) is widely employed as a refractory product, both to make up substantially all of a brick composition in the case of magnesia brick, and also as the magnesia component of other brick. The calcined magnesia may be used as a component in a mixture with chrome ore. Magnesia is also used in refractory brick along with additions of alumina, of chromic oxide or other substances.

The present invention relates to the improvement of the refractory properties and particularly the strength of brick at high temperature, whether the magnesia is used as substantially the entire brick composition or as the magnesia component of a brick as above referred to.

Refractory products made of calcined magnesia, with or without additions of chrome ore, alumina or chromic oxide, are now frequently produced from calcined magnesia manufactured from sea water or from brine, or made by calcining natural magnesite such as the magnesite occurring in Greece or India.

This type of magnesia (herein called Type I) is characterized by an MgO content of greater than 90 percent by weight and usually in excess of 94 or 95 percent by weight, a ratio of lime and silica as an impurity by weight of one or less, a relatively minor or insignificant content of ferric oxide (usually less than one percent by weight) and a minor content of alumina (usually much less than one percent by weight). A lower limit of the lime-silica ratio in Type I magnesia is difficult to set because the lime may go down to 0.1 percent and the silica may be as high as 10 percent in which case the lime-silica ratio of Type I calcium magnesia is 0.01. The content of silica is typically in the range of 2 to 3 percent by weight and the content of lime is typically in the range of 1 to 2 percent by weight. This completes the usual composition except for loss on ignition.

Typical chemical analyses by weight of this type of calcined magnesia are:

|  | Percent | |
| --- | --- | --- |
| Ignition Loss | 0.25 | 0.17 |
| $SiO_2$ | 2.62 | 2.77 |
| $Fe_2O_3$ | 0.09 | 0.56 |
| $Al_2O_3$ | 0.26 | 0.49 |
| CaO | 1.63 | 1.52 |
| MgO (by diff.) | 95.15 | 94.49 |

Calcined magnesia of Type I contains in addition to forsterite a substantial mineralogical component of calcium magnesium silicate in accordance with the content of lime-silica mentioned above, which at higher temperatures such as those of use in the open hearth furnace or in a cement kiln, adversely affects the ability of the brick made from such Type I calcined magnesia to remain volume stable or to support static load at high temperature without deformation. This is true notwithstanding the fact that 95 percent by weight or more of MgO is present.

There is another type of calcined magnesia which, for the purpose of the present discussion, is being designated as Type II, made by calcining beneficiated magnesite prepared from deposits in Austria.

This Type II calcined magnesia is characterized by containing more than 2 percent by weight, and usually 5 percent or more of iron oxide. The Type II magnesia will contain from 2 to 7 percent or more of dicalcium ferrite ($C_2F$). The ratio of lime to silica as an impurity by weight exceeds 2. The upper limit of the lime-silica ratio of Type II magnesia is difficult to set because Type II magnesia may have as little as 0.2 percent silica and may have less than 5 percent lime. The silica content is typically in the range between 0.25 and 1 percent by weight and the lime is typically in the range between 2.5 and 3.5 percent by weight. The MgO content is normally in excess of 90 percent by weight. The alumina is a minor quantity usually substantially less than 1 percent by weight. The balance of the usual composition is loss on ignition.

A typical analysis of Type II calcined magnesia is as follows:

| | Percent |
| --- | --- |
| Ignition loss | 0.28 |
| $SiO_2$ | 0.50 |
| $Fe_2O_3$ | 5.19 |
| $Al_2O_3$ | 0.57 |
| CaO | 3.04 |
| MgO (diff.) | 90.42 |

Type II calcined magnesia contains as a substantial mineralogical component dicalcium ferrite which, at high temperatures of service, adversely affects the ability of a refractory brick made from Type II calcined magnesia to remain volume stable or to support static load without deformation in spite of the content of more than 90 percent of MgO by weight.

The present invention contemplates making magnesia-containing refractory brick which will have improved strength at high temperatures because the calcined magnesia component itself has improved high temperature strength.

To accomplish this, a blend of Type I and Type II calcined magnesia is used which will cause the calcium magnesium silicate and the dicalcium ferrite to react and form refractory ingredients which have increased strength at high temperatures, particularly magnesia ferrite.

In accordance with the invention the Type I and Type II calcined magnesia are blended together in proportions by weight of between 20 and 80 percent of each and preferably between 40 and 60 percent of each and most desirably in equal proportions, with a view to obtaining a blended component which contains more than 90 percent by weight of magnesia on a calcined basis and between 0.8 and 3 percent by weight of silica, and which has a ratio of lime to silica which is intermediate between that characterized by Type I and that characterized by Type II calcined magnesia.

These two types of calcined magnesia are desirably employed in proper particle sizes as well known in the art and have the effect of diminishing the disadvantages from the presence of monticellite and from the presence of dicalcium ferrite when the refractory mixture is heated during use in the case of unfired brick and during firing in the case of a fired brick. The lime changes into merwinite and the iron forms a magnesium ferrite and the presence of both of these mineralogical ingredients improves the strength at high temperature as compared with the ingredients formerly present.

In mixing the magnesia to cause dicalcium ferrite to react to form magnesium ferrite and a compound containing lime and silica, it is evident that if the ratio of lime to silica in the mixture is more than 1.5, as for example 1.75, two lime silica compounds would be formed, i.e., merwinite and dicalcium silicate. It is my intent to claim the process in which dicalcium ferrite and magnesium silicates low in lime (or free from lime) react to form magnesium ferrite and a refractory lime-bearing silicate which may be merwinite or dicalcium silicate or both depending on the lime-silica ratio of the mixture.

Any blend of calcined magnesia of Type I and Type II may be used which will give a mixture containing 90 percent of MgO on a calculated weight basis and $SiO_2$ between 0.8 and 3 percent by weight, but for best results the blend should be calculated on the basis of the analysis of the particular Type I and Type II calcined magnesia to convert the ferric oxide to a magnesium ferrite and to convert the lime and silica to merwinite or dicalcium silicate or both.

The principles of the invention can be applied to so-called straight magnesia refractory brick which are free from chrome, and mixtures of magnesia with chrome ore, and also to magnesia refractory brick containing added calcined alumina or chromic oxide preferably in the form of coarse particles.

The principles of the invention may be applied to brick which are kiln-fired or to brick which are installed unfired after drying and curing.

Example I

For the manufacture of chrome-free magnesia brick both types of calcined magnesia, Type I and Type II, are ground and screened to produce particles within three size ranges. One particle size passes through 4 mesh per linear inch and rests on a screen of 8 mesh per linear inch. The next size passes through 8 mesh per linear inch and rests on 28 mesh per linear inch. The third size passes practically all through 48 mesh per linear inch.

Type I and Type II calcined magnesias of the various particle sizes are then combined in the following proportions by weight:

| | Percent |
|---|---|
| Type I magnesia, 4 x 8 mesh | 12.5 |
| Type I magnesia, 8 x 28 mesh | 25.0 |
| Type I magnesia, through 48 mesh | 12.5 |
| Type II magnesia, 4 x 8 mesh | 12.5 |
| Type II magnesia, 8 x 28 mesh | 25.0 |
| Type II magnesia, through 48 mesh | 12.5 |

This mixture is moistened with a dilute solution of sulfuric acid to give it about 2.7 percent moisture and 1.1 percent sulfuric acid based on the weight of the refractory as well known in the art. The brick is molded under a suitable molding pressure in excess of 5,000 p.s.i. and preferably under a pressure of about 15,000 p.s.i. The brick are then dried at a temperature of about 300° F., preferably using a curing process employing carbon dioxide as set forth in my U.S. Patent No. 2,656,279. If the brick are to be used unfired they are ready for use and will be subject during service to a temperature in a range of 1200° and 1700° C.

The analyses of such brick by weight on a calcined basis are as follows:

| | Percent |
|---|---|
| $SiO_2$ | 1.56 |
| $Fe_2O_3$ | 2.64 |
| $Al_2O_3$ | 0.42 |
| CaO | 2.34 |
| MgO | 93.04 |

Such a composition, low in silica, minimizes the tendency for the brick to crack during use at about 1" to 3" from the hot face, due to the low amount of silicates which can migrate into this area at high temperature.

Where desired, such brick can be kiln-fired at a temperature between 1200° and 1700° C., but this is not necessary.

Example II

To make refractory brick-containing alumina or chromic oxide, a mix is produced containing proper sizes of particles of Type I and Type II calcined magnesia as shown in Example I. To this mixture suitably chosen particles of calcined alumina, or chromic oxide, preferably passing through an 8 mesh screen, or even passing a 48 mesh screen or finer, in amounts from 1 to 10% by weight of the magnesia refractory, are added.

This is then treated according to the procedure of Example I.

In all of the examples where mesh per linear inch is mentioned it is intended to indicate Tyler standard mesh per linear inch.

The refractory mixtures referred to when used in the unfired state, can be molded to have both external steel plates and internal steel plates in accordance with U.S. Patents Nos. 2,247,376 and 2,791,116. The bricks may also be provided with hanger means according to U.S. Patents Nos. 2,517,876 and 2,781,006 and 2,932,265.

The refractories of the invention have excellent physical properties and give improved service life.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. A process of making refractory brick based on calcined magnesia which comprises mixing
   (a) from 20 to 80% by weight of a magnesia having the following composition by weight:
   MgO in excess of 90%,
   dicalcium ferrite as a mineralogical component 2 to 7%,
   lime-silica ratio in excess of 2,
   ferric oxide more than 2%,
   silica 0.2 to 1%, and
   lime less than 5%, with
   (b) an amount from 20 to 80 percent by weight of a magnesia able to react with said dicalcium ferrite to convert dicalcium ferrite to magnesium ferrite and form a compound of the class consisting of merwinite and dicalcium silicate, and the latter said magnesia having the following composition by weight:
   MgO in excess of 90%,
   lime-silica ratio less than 2,
   ferric oxide less than 1%,
   silica less than 10%, and
   lime 0.1 to 3%, and
   (c) said mixture containing from 0.8 to 3% silica by weight,
   (d) molding said mixture into a refractory brick at a pressure in excess of 5000 p.s.i., and
   (e) subjecting said refractory brick to a temperature between 1000° and 1700° C.

2. A process of claim 1, in which said magnesia containing ferric oxide less than 1% has a lime-silica ratio of less than 1.

3. A process of claim 1, which comprises introducing from 1 to 10% by weight of the magnesia material, of a material of the class consisting of calcined alumina and chromic oxide in the mix.

References Cited by the Examiner

UNITED STATES PATENTS 2,291,918   8/42   Pitt et al. _____ 106—60

FOREIGN PATENTS 447,525   5/36   Great Britain.

TOBIAS E. LEVOW, *Primary Examiner.*